May 13, 1941.  J. T. GILSTRAP  2,241,851
FISHING TACKLE
Filed July 30, 1940
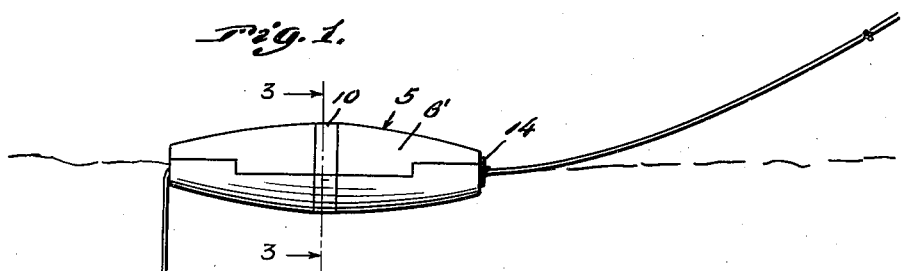
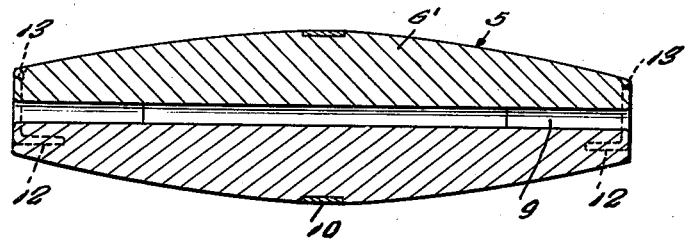
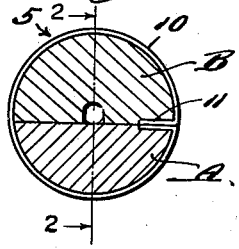 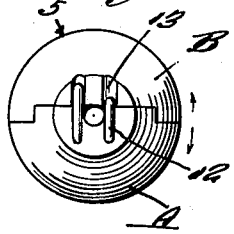
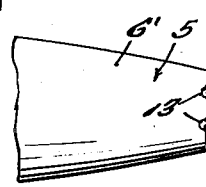
Inventor
Julian T. Gilstrap
By Clarence A. O'Brien
Attorney Patented May 13, 1941

2,241,851

UNITED STATES PATENT OFFICE 2,241,851

FISHING TACKLE

Julian T. Gilstrap, Corpus Christi, Tex., assignor of one-fourth to C. W. Critchfield, Corpus Christi, Tex.

Application July 30, 1940, Serial No. 348,523

4 Claims. (Cl. 43—49)

This invention relates to fishing tackle, and more particularly to a float for a fishing line, and has for the primary object the provision of a device of this character which may be easily and quickly applied and removed from the fishing line without disturbing or detaching any of the other tackle connected to said line and which will be efficient, durable and compact and may be manufactured and sold at a low cost.

With these and other objects in view, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a float connected to a fishing line and constructed in accordance with my invention.

Figure 2 is a vertical sectional view illustrating the float and taken on the line 2—2 of Figure 3.

Figure 3 is a transverse sectional view illustrating the float and taken on the line 3—3 of Figure 1.

Figure 4 is an end view illustrating the float.

Figure 5 is a fragmentary plan view illustrating a portion of the float.

Figure 6 is a front elevation of the line disc.

Referring in detail to the drawing, the numeral 5 indicates as an entirety a float constructed in accordance with the present invention and which may be readily snapped onto and off of a fishing line 6 without disturbing or disconnecting the sinker 7, hook 8 or any other tackle that may be connected with the line and which may be readily adjusted to a selected position on the line.

The float 5 is constructed of cork or any other buoyant material suitable for the purpose and consists of an elongated substantially cylindrical body 6 tapering from its medial portion towards each end. The body 6 is constructed of companion sections A and B separable from each other. The sections A and B have formed therein grooves 9 which when brought in alignment by the positioning of the sections together form a line passage extending from end to end of the body.

It is to be understood that the passage is for the purpose of receiving the fishing line 6. The opposed faces of the sections A and B are formed in stepped formation and interfit with each other when the sections are brought together to prevent the sections from shifting laterally of each other. The body 6 at the medial portion of the float is provided with a peripheral groove in which is seated a split resilient band 10 having angularly related ends 11 adapted to enter grooves formed in the opposing faces of the sections A and B. The ends 11 retain the band on the sections. However, the band will flex when exertion is applied on the sections in the direction of separating said sections so that the line passage may be opened to permit a line to be freely passed into or out of the passage without interference by the split band.

The section B at the ends thereof has secured thereto spaced guide elements 12 which extend into grooves 13 of the section A when said sections are assembled together. The guide elements are positioned at opposite sides of the line passage for the purpose of guiding the fishing line and aiding in preventing the latter from moving out of the passage accidentally.

An apertured disc 14 may be adjustably secured on the line to engage one end of the body 6 by providing a slidable knot in the line whereby the float may be adjusted along the line.

It will be seen from the foregoing description that a very efficient, practical, durable and compact float has been provided for a fishing line wherein the float is composed of companion sections yieldably connected whereby the sections may be slightly separated to permit the insertion and removal of a fishing line.

A float constructed in accordance with the foregoing obviates the necessity of removing other tackle from the fishing line whenever it is desired to apply or remove the float from the fishing line, consequently rendering a saving of time in rearranging the fishing line for different types of fishing.

While I have shown and described the preferred embodiment of my invention, it is to be understood that minor changes in construction, combination and arrangement of parts may be made without departing from the spirit and scope of the invention claimed.

Having thus described my invention, what I claim is:

1. In a fishing float of the character described, an elongated body tapering from its medial portion towards each end and composed of companion sections, said sections having a passage, said body having a peripheral groove, a split yieldable clamp mounted in said groove and having angularly disposed ends fitting between the companion sections for yieldably securing the sections together whereby they may be parted to permit the insertion and removal of a line in the passage.

2. In a fishing float of the character described, an elongated body tapering from its medial portion towards each end and composed of companion sections, said sections having a line passage, said body having a peripheral groove, a split yieldable clamp mounted in said groove and having angularly disposed ends fitting between the companion sections for yieldably securing the sections together whereby they may be parted to permit the insertion and removal of a line in the line passage, said sections having stepped interlockable faces to prevent the sections from shifting laterally of each other.

3. In a fishing float of the character described, an elongated body tapering from its medial portion towards each end and composed of companion sections, said sections having a line passage, said body having a peripheral groove, a split yieldable clamp mounted in said groove and having angularly disposed ends fitting between the companion sections for yieldably securing the sections together whereby they may be parted to permit the insertion and removal of a line in the line passage, said sections having stepped interlockable faces to prevent the sections from shifting laterally of each other, and spaced guide elements carried by the ends of one of the sections and overlapping the ends of the other section and arranged at opposite sides of the line passage.

4. A fishing line float comprising a body composed of companion sections having parallel opposed flat faces and each provided with a groove extending the full length of the section whereby said grooves form a line passage when the opposed flat faces of said sections are arranged in abutting engagement, and a split yieldable band encircling said body to normally maintain the sections thereof assembled and to permit manual separation of said sections to allow a line to be moved into and out of the passage.

JULIAN T. GILSTRAP.